(12) United States Patent
Krueger

(10) Patent No.: US 6,988,344 B1
(45) Date of Patent: Jan. 24, 2006

(54) MODULAR WALL STRUCTURAL ELEMENTS, AND METHODS OF USING SAME

(75) Inventor: Douglas D. Krueger, Birmingham, MI (US)

(73) Assignee: Concord Industrial Corp., Birmingham, MI (US)

( * ) Notice: Subject to any disclaimer, the term of this patent is extended or adjusted under 35 U.S.C. 154(b) by 0 days.

(21) Appl. No.: 10/447,613

(22) Filed: May 29, 2003

Related U.S. Application Data

(60) Provisional application No. 60/402,412, filed on Aug. 9, 2002.

(51) Int. Cl.
*E04C 3/00* (2006.01)

(52) U.S. Cl. .............................. 52/464; 52/468; 52/769

(58) Field of Classification Search .................. 52/464, 52/468, 584.1, 770, 772, 775, 36.1, 239, 52/463, 471, 281, 769, 768
See application file for complete search history.

(56) References Cited

U.S. PATENT DOCUMENTS

| | | | |
|---|---|---|---|
| 3,503,166 A | * | 3/1970 | Lipper et al. ............... 52/126.6 |
| 4,784,552 A | | 11/1988 | Rebentisch |
| 4,910,938 A | | 3/1990 | McGee |
| 4,984,400 A | * | 1/1991 | Bockmiller ................... 52/241 |
| 5,233,803 A | * | 8/1993 | Bockmiller ................... 52/239 |
| 5,287,675 A | | 2/1994 | McGee |
| 6,076,322 A | | 6/2000 | D'Andrea et al. |

* cited by examiner

*Primary Examiner*—Naoko Slack
(74) *Attorney, Agent, or Firm*—Carrier, Blackman & Associates, P.C.; William D. Blackman; Joseph P. Carrier

(57) ABSTRACT

A kit, system, and method for use in interconnecting wall panel sections to subdivide interior spaces within a building. Included are components and methods to assemble multiple in-line wall panel sections and corners, as well as optional roof members, windows, and doors.

11 Claims, 8 Drawing Sheets

MODULAR WALL STRUCTURAL ELEMENTS, AND METHODS OF USING SAME

This application claims the benefit of provisional application Ser. No. 60/402,412 filed Aug. 9, 2002.

BACKGROUND OF THE INVENTION

1. Field of the Invention

The present invention relates to modular wall structures for subdividing space within a building. More particularly, the present invention relates to structural elements for use in interconnecting adjacent wall panel sections, to kits and systems of modular wall structural elements, and to methods of using the structural elements to subdivide space within a building.

2. Description of the Background Art

A number of different systems, and related hardware, are known for subdividing space within an existing building. Examples of some of the known systems and related hardware include U.S. Pat. No. 4,784,552 to Rebentisch, U.S. Pat. No. 4,910,938 to McGee, U.S. Pat. No. 5,233,803 to Bockmiller, U.S. Pat. No. 5,287,675 to McGee, and U.S. Pat. No. 6,076,322 to D'Andrea et al.

Rebentisch, U.S. Pat. No. 4,784,552, issued in 1988 and entitled "Nuts for Channeled Structural Members", discloses a specialized Unistrut® nut that fits into a substantially C-shaped channel of a frame member.

McGee, U.S. Pat. No. 4,910,938, issued in 1990 and entitled "Wall Stud for Portable In-Plant Building", discloses a two-piece wall stud for interconnecting adjacent panel members of an in-plant or portable building. First and second stud members fit together in telescoping engagement, and are attached to one another using threaded fasteners. The first and second stud members cooperate to clamp adjacent wall panels therebetween, thereby interconnecting the wall panels.

Bockmiller, U.S. Pat. No. 5,233,803, issued in 1993 and entitled "Framing Apparatus for Clean Room Wall System", discloses an elongated structural member having opposed contact surfaces, which may be positioned between opposed ends of adjacent panels. The Bockmiller reference discloses a pair of channel members, which may be bolted together to clamp adjacent panel ends therebetween, interconnecting the wall panels. The structural member of Bockmiller also includes gaskets disposed in recesses therein.

McGee, U.S. Pat. No. 5,287,675, issued in 1994 and entitled "Wall Stud Assembly", discloses a stud assembly for a wall of an in-plant or portable building. The wall includes interfitting wall stud assemblies and wall panels. The stud assembly of McGee includes first and second stud members, each of which is generally U-shaped in cross-section. In addition, a strut having a generally C-shaped cross-section is positioned longitudinally between the first and second stud members and affixed thereto. The flanges of one stud member are in spaced generally parallel relation to the flanges of the other stud member, to sandwich a wall panel therebetween.

D'Andrea et al, U.S. Pat. No. 6,076,322, issued in 2000 and entitled "Wall Stud Assembly for use in Forming Prefabricated Partitions or Walls", discloses a wall stud assembly used to form a prefabricated partition or wall assembled within the interior space of a warehouse, factory or other building structure.

The assembly of D'Andrea includes a first elongate stud member and a second elongate stud member, each having a joining part. Each of the joining parts of the stud members includes a plurality of punched holes and extruded holes formed therein, to allow interconnecting fasteners to be applied to the stud member from either side of the stud assembly.

Although the known systems are usable for their intended purposes, a need still exists in the art for improved structural elements for interconnecting modular walls to subdivide building space. In particular, there is a need for improved structural elements which will enable a user to easily assemble components, which will provide for durable structures, and which will provide a pleasing appearance in a finished installation thereof.

SUMMARY OF THE INVENTION

The present invention provides a kit, system, and method for use in interconnecting wall panel sections, to subdivide interior space within a building.

In a first embodiment of the present invention, a kit of components is provided which is usable to interconnect adjacent in-line wall panel sections.

A kit of components according to this first embodiment includes a outside linear flashing unit and a inside linear flashing unit for spaced-apart placement between two adjacent wall sections, and for cooperating with selected fasteners to clamp end portions of the wall sections therebetween.

The outside linear flashing unit, according to the first embodiment, includes a backing plate and two spaced-apart side members integrally attached to the backing plate. Each of the side members includes a first side wall portion and a flange extending from the side wall portion.

In the above structure, the backing plate and the side members define an open channel therebetween which is adapted to slidably receive a threaded nut therein. The flanges of the side members extend inwardly toward one another from the side wall portions, to cover part of the open channel.

The inside linear flashing unit is provided for placement opposing the outside linear flashing unit, and for clamping edge portions of adjacent in-line wall panel sections therebetween. The inside linear flashing unit includes a center plate having a plurality of openings formed therethrough, and two spaced-apart side members integrally attached to the center plate.

Each of the side members of the inside linear flashing unit includes a side wall portion and a flange extending substantially transversely from the side wall portion. The flanges of the inside unit are situated substantially in the same plane, and extend away from the side wall portions in opposite directions. The flanges of the inside unit are provided for overlapping placement against selected surfaces of the adjacent wall panel sections.

Another embodiment of the invention provides a kit of components for use in joining adjacent corner wall sections together to form a corner wall seam. The corner wall seam kit includes an outside corner flashing unit and an inside corner flashing unit which cooperate to sandwich a pair of transversely oriented wall panel sections therebetween.

Another embodiment of the invention relates to a window frame interface member, which can be subdivided to form multiple window frame segments. The window frame segments can be situated surrounding a windowpane, and can then be joined together with L-brackets, to form a window structure that fits between wall panel sections.

Still another embodiment of the invention relates to a system including one or more linear wall seam assemblies, one or more corner seam assemblies, and one or more window interface members.

Accordingly, it is an object of the present invention to provide a method and kit of components usable with a plurality of wall panels to assemble a modular wall structure, which may be constructed inside of an existing building.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF THE PREFERRED EMBODIMENTS

Figure 1:
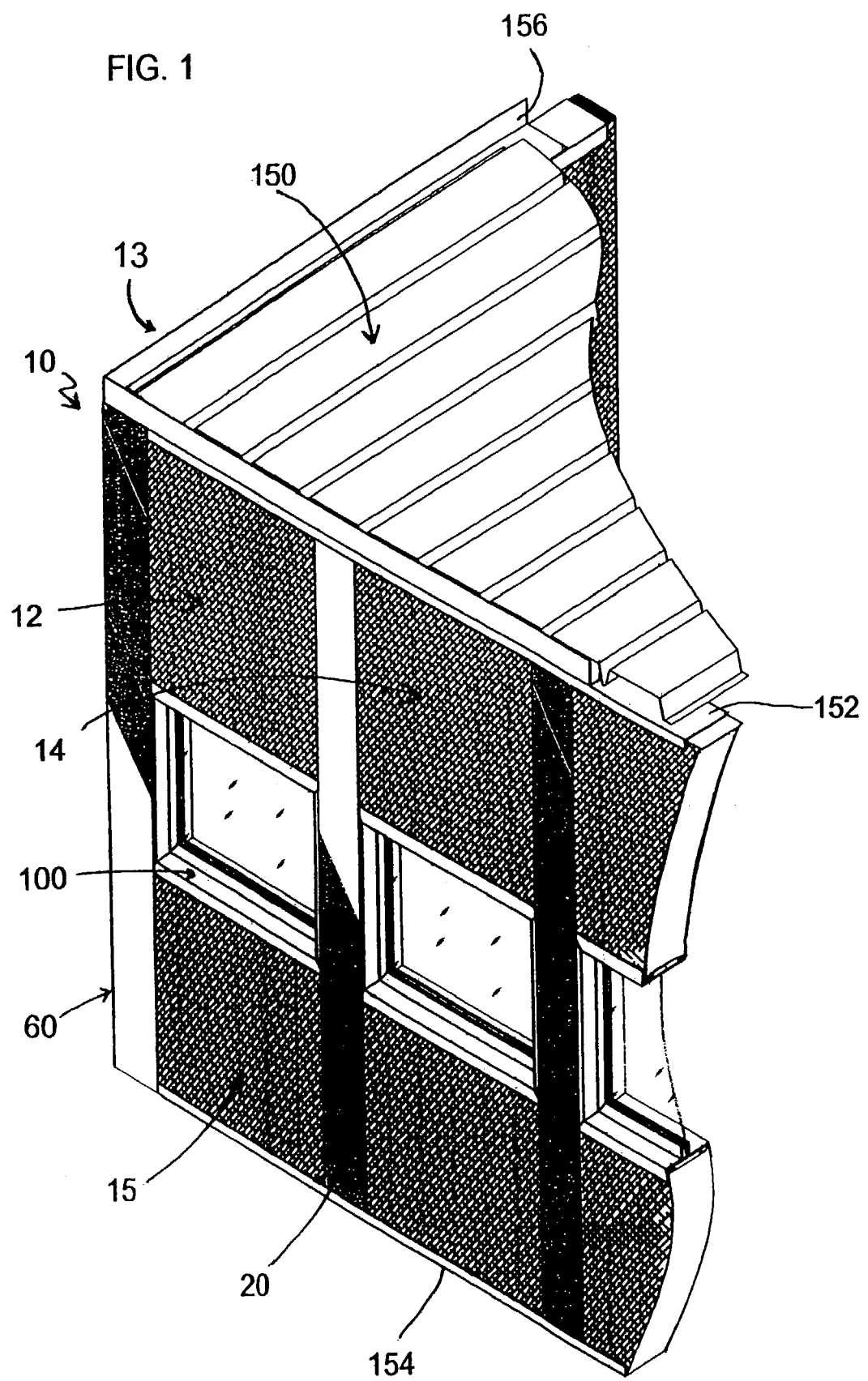
FIG. 1 is a perspective view of a portion of a modular wall structure according to the present invention.

Referring to the drawings, FIG. 1 shows a cut away perspective view of a modular building structure 10 according to an illustrative embodiment of the invention.

The modular building structure 10 consists primarily of a wall structure 15 and related hardware and subassemblies, as will be further explained herein. Space isolated by the wall structure 15 may function as an office, storeroom, shop area, or other use selected by a user.

The modular building structure 10 of FIG. 1 includes two adjacent in-line wall panel sections 12, 14 interconnected by an in-line seam assembly 20, and at least one window assembly 100 placed in an opening formed in one of the panel sections 12. The modular building structure 10 also includes two adjacent wall panel corner sections 12, 13 interconnected by a corner seam assembly 60.

The modular building structure 10 is preferred to include a conventional door frame and door assembly (not shown), and may also include a corrugated roof panel 150 to keep dust out of the space enclosed thereby.

Other optional components of the modular building structure 10 include upper wall flashing 152, lower wall flashing 154, and upper roof deck flashing 156.

A modular building structure 10 according to the invention is not primarily intended to be free standing, or to form an exterior structure. Instead, the modular building structure 10 is primarily intended to be assembled indoors, to subdivide the existing space inside warehouse, assembly plant or other existing structure.

Alternatively, the materials according to the invention may be adapted to be used outdoors, to construct temporary or portable buildings.

Figure 2:
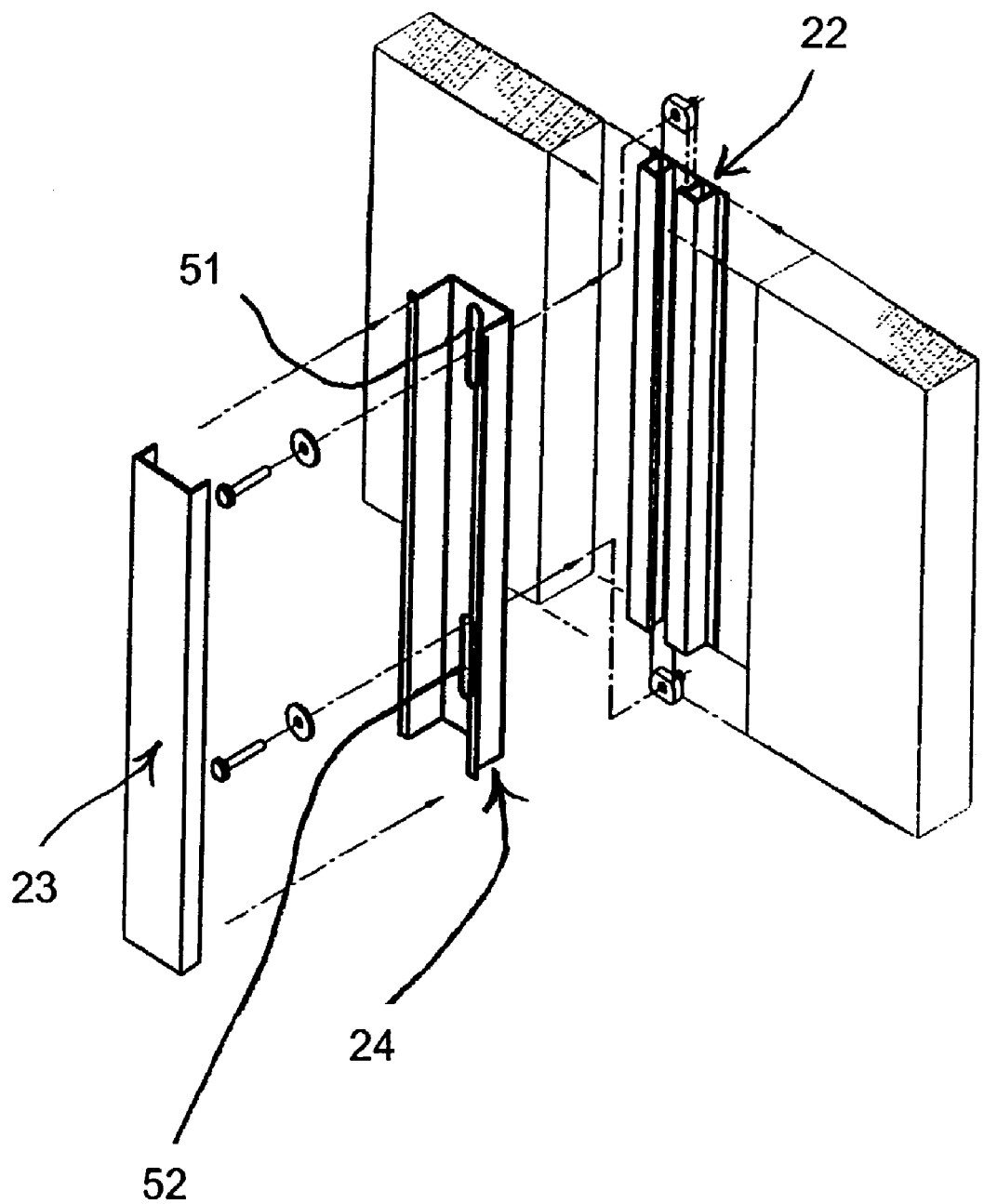
FIG. 2 is an exploded perspective view of an in-line wall seam assembly according to the present invention.
Figure 3:
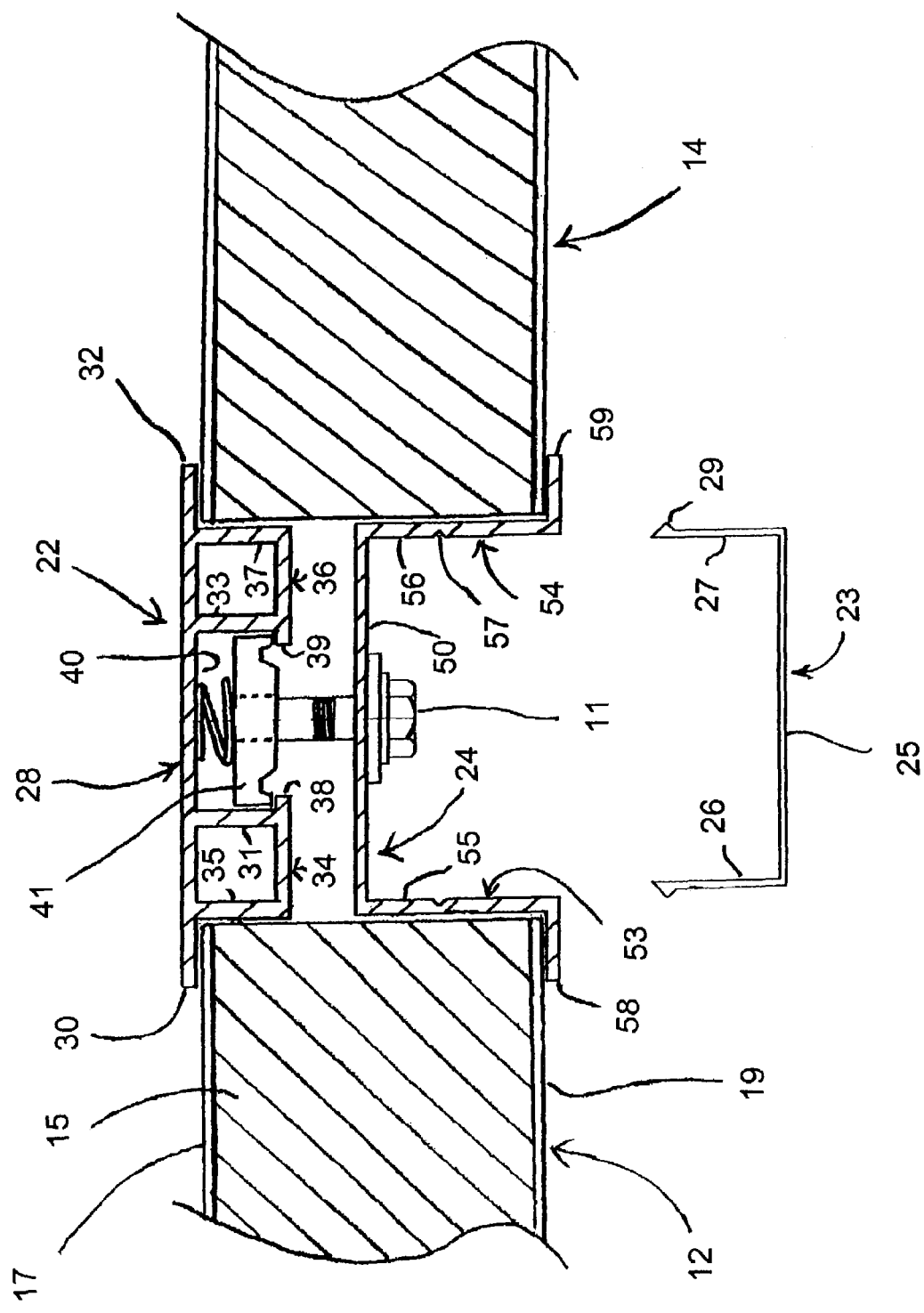
FIG. 3 is a cross-sectional view of the in-line wall seam assembly of FIG. 2.

In a first embodiment, the present invention provides a kit of components for use in constructing an in-line panel seam 20 to interconnect adjacent in-line wall panel sections 12, 14 in a modular building structure 10. The kit of the first embodiment includes at least one outside linear flashing unit 22 and at least one inside linear flashing unit 24 (FIGS. 2–3). Optionally, the kit may also include fasteners and/or a decorative cap 23 for placement in the inside linear flashing unit 24, to cover the fastening hardware and shield it from view.

The Panel Sections

The wall panel units 12, 14 are not necessarily part of the present invention, although in one embodiment, the present invention encompasses a modular wall structure including a plurality of panel units 12, 14.

The first and second wall panel units 12, 14 have a substantially identical structure and composition, with the exception of possible openings formed therein such as door or window openings. Accordingly, a discussion of the structure of the first wall panel unit 12 will be sufficient.

Shown in FIG. 3, panel section 12 has an insulating foam core 15 with a covering skin 17, 19 respectively, glued or otherwise attached to the foam core 15 on each of the opposed sides thereof. The skin 17, 19 is formed from a strong, durable material such as metal or a tough, strong and non-brittle plastic. This type of paneling material is known and is commercially available.

The Linear Panel Connectors

The present invention relates to a linear panel fastening structure, including components for use in interconnecting adjacent in-line wall panel sections, such as those shown at 12 and 14 in FIG. 3.

A linear panel fastening structure according to the embodiment of FIGS. 2–3 includes an elongated outside linear flashing unit and an elongated inside linear flashing unit. The linear flashing units are provided for spaced-apart placement between two adjacent wall sections, and for cooperating with selected fasteners to clamp end portions of the wall sections therebetween.

The Outside Linear Flashing Unit

The outside linear flashing unit 22, according to the first embodiment, includes a generally flat backing plate 28 having opposed edge portions 30, 32 for overlapping placement against selected surfaces of the adjacent wall panel sections 12, 14.

The outside linear flashing unit 22 also includes two spaced apart side members 34, 36 integrally attached to and extending away from the backing plate.

In the embodiment of FIG. 3, each of the side members 34, 36 has a respective first side wall portion 31, 33, a second side wall portion 35, 37 which is substantially parallel to the first side wall portion, and a respective lip flange 38, 39 extending substantially transversely inwardly and away from the first side wall portion.

In the above structure, the backing plate 28 and the side members 34, 36 define an open channel 40 therebetween which is adapted to slidably receive a threaded nut 41 therein. As shown, the nut 41 includes a main body having a threaded opening formed therein, and a spring connected to one side of the main body. When the nut 41 is disposed in the open channel 40, outer edges of the main body engage the flanges 38, 39 and the spring engages the backing plate 28, such that the nut is normally maintained in place within the channel by the force of the spring. The nut 41 may be selectively moved by pressing the main body to compress the spring, and sliding the nut to a different position. A nut sold by the UNISTRUT® corporation, and as described in U.S. Pat. No. 4,784,552 is suitable for use with the outside linear flashing unit 22 hereof, and such nuts are commercially available from the UNISTRUT® corporation of Wayne, Mich. The disclosure of U.S. Pat. No. 4,784,552 is hereby incorporated by reference. The lip flanges 38, 39 extend inwardly toward one another from the respective first side wall portions 31, 33, to cover part of the open channel 40, and to permit trapping of the nut 41 therein.

The Inside Linear Flashing Unit

The inside linear flashing unit 24 is provided for placement opposing the outside linear flashing unit and for cooperating with the outside linear flashing unit 22 to clamp edge portions of the adjacent wall panel sections 12, 14 therebetween. In the depicted embodiment, the inside linear flashing unit 24 includes a center plate 50 having a plurality of openings 51, 52 formed therethrough, and two spaced apart side members 53, 54 integrally attached to and extending away from the center plate. As shown, the openings 51, 52 are elongated and spaced from each other in the longitudinal direction of the center plate 50.

Each of the respective side members 53, 54 of the inside linear flashing unit 24 includes a respective side wall portion 55, 56 and a respective flange 58, 59 integrally connected to, and extending substantially transversely away from the respective side wall portion.

The flanges 58, 59 of the inside linear flashing unit 24 extend away from the side wall portions 55, 56 in opposite directions, and are situated substantially in the same plane. The flanges 58, 59 of the inside linear flashing unit are provided for overlapping placement against selected surfaces of the adjacent wall panel sections 12, 14.

Optionally, each of the side wall portions 55, 56 may have a cutout groove 57 formed therein to receive a detent boss 29 of the cap 23, as will be discussed further herein.

It will be seen from a review of FIGS. 2 and 3 that when joining adjacent in-line wall panel sections 12, 14 together using the inside linear and outside flashing units 22, 24 hereof, the outside linear flashing unit 22 is placed between and touching the panel ends with the flanges 30, 32 covering end portions of the panel sections. Then, a suitable number of UNISTRUT® nuts 41 are placed sideways inside of the channel 40, and the nuts are then rotated 90 degrees so that they fit behind the opposed flanges 38, 39 of the side members 34, 36.

Then, the inside linear flashing unit 24 is slid between panel sections 12, 14 with the flanges 58, 59 partially covering end portions of the panels. A bolt 11 is then inserted through each opening 51, 52 in the inside linear flashing unit, and is threadably installed in the nut 41. The bolt 11 is then tightened to draw the inside and outside flashing units 22, 24 toward one another, and to clamp the ends of the wall panels 12, 14 therebetween, thereby connecting them.

The Cap

The cap 23 is an optional member for use with the inside linear flashing unit 24. The cap 23 is substantially U-shaped in cross-section, as shown. The cap 23 is integrally formed from a plastic material, and includes a main crosspiece 25 and two side pieces 26, 27 extending transversely outwardly from opposite sides of the main crosspiece. Optionally, the side pieces 26, 27 may have detent bosses 29 formed thereon, to fit into the cutout grooves 57 of the inside linear flashing unit, and to resiliently engage the cap therein.

The cap 23 fits into the inside linear flashing unit 24 to cover the holes and fasteners therein, and to present a more ornamental and decorative appearance than would otherwise be the case. The cap 23 can be made in different colors to match any selected decor.

The Corner Connectors

The present invention also relates to a corner fastening structure 60 (FIGS. 4–5), including components for use in interconnecting adjacent wall panel corner sections 12, 13.

Figure 4:
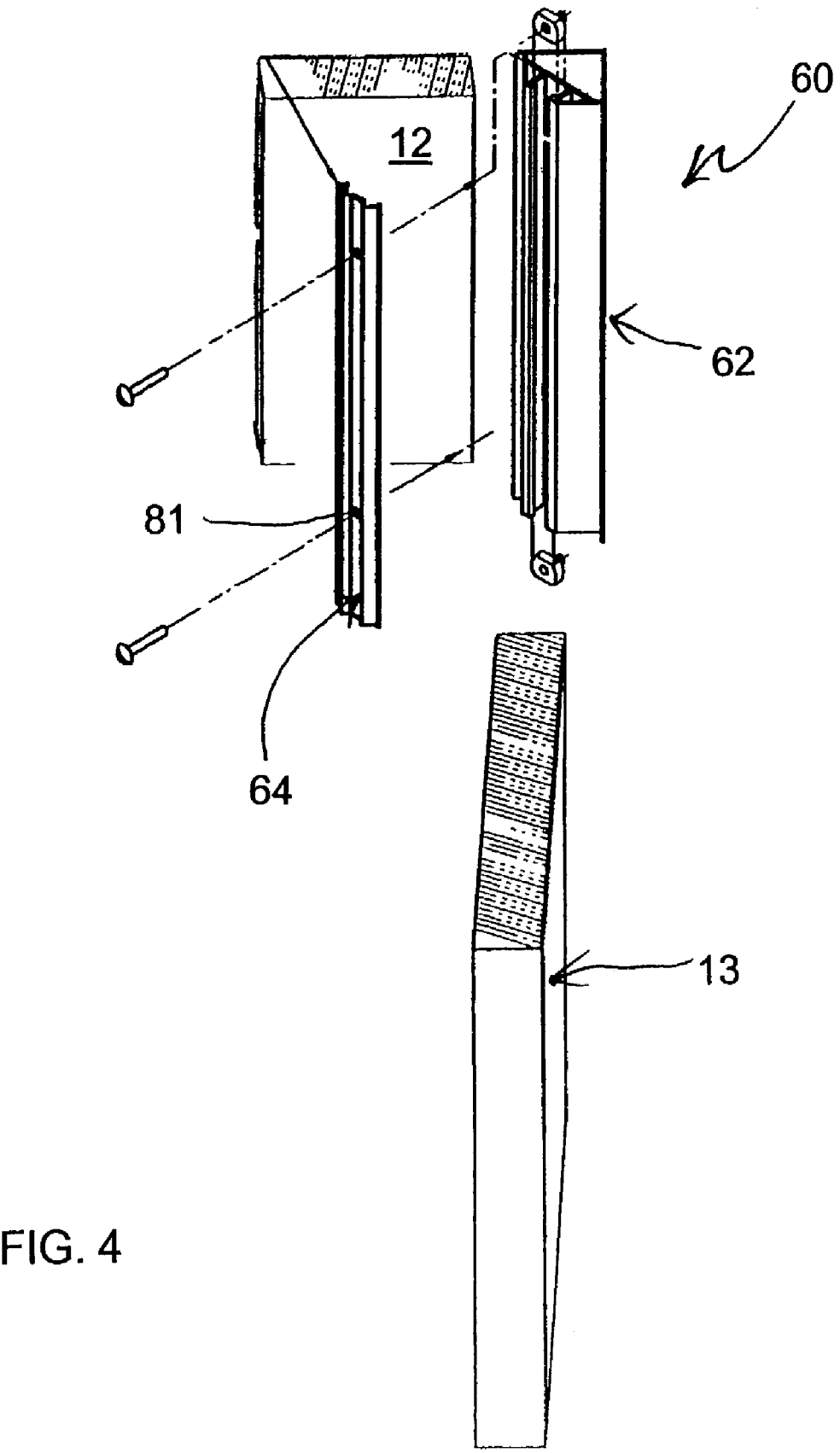
FIG. 4 is an exploded perspective view of a corner wall seam assembly according to the present invention.
Figure 5:
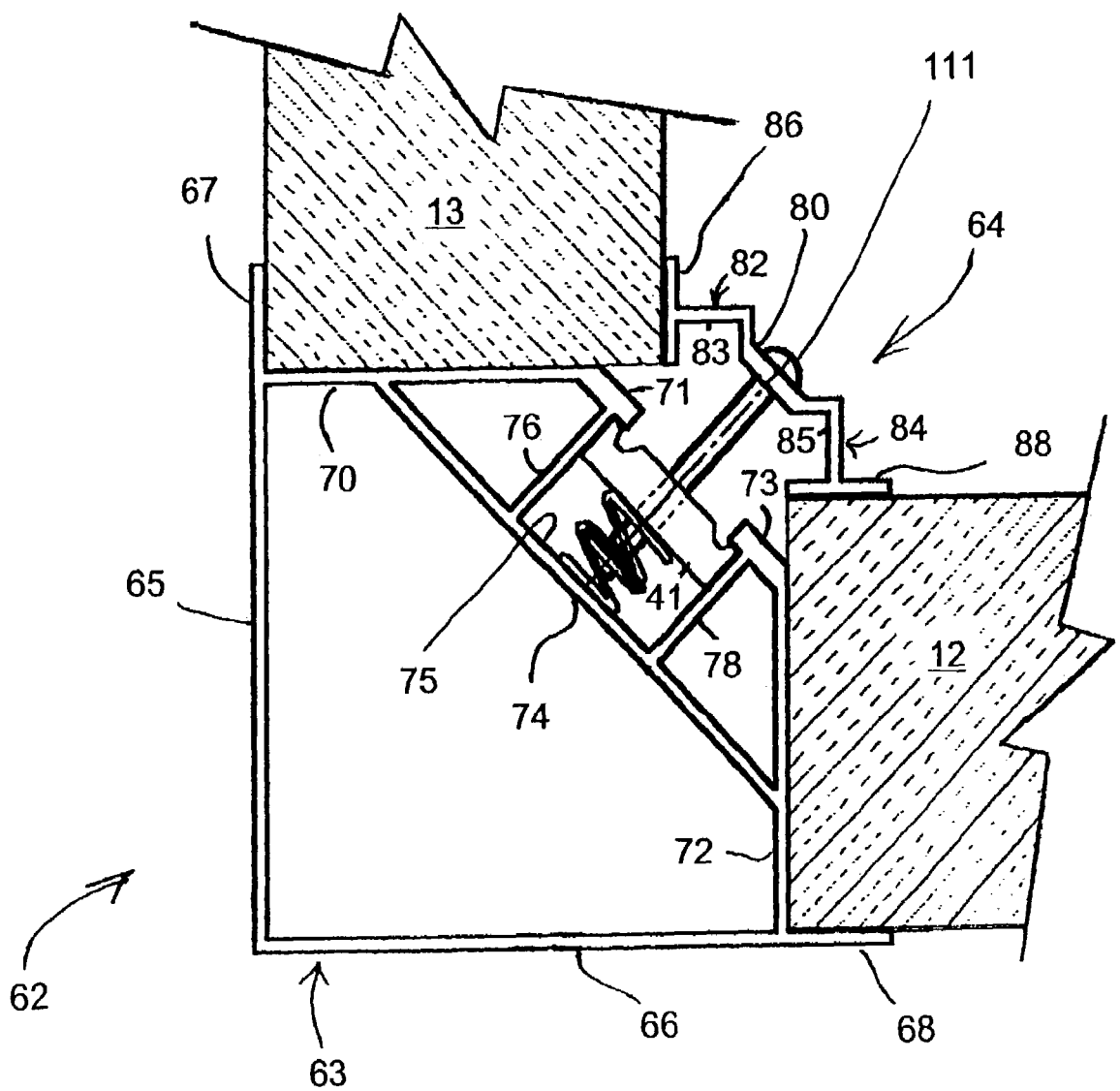
FIG. 5 is a cross-sectional view of the corner wall seam assembly of FIG. 4.

A corner fastening structure 60 according to the embodiment of FIGS. 4–5 includes an elongated outside corner flashing unit 62 and an elongated inside corner flashing unit 64. The corner flashing units 62, 64 are provided for spaced-apart placement between two adjacent perpendicular wall sections 12, 13, and for cooperating with selected fasteners to clamp end portions of the perpendicular wall sections therebetween.

The Outside Corner Flashing Unit

The outside corner flashing unit 62 includes an outside corner portion 63 having a substantially L-shaped cross sectional shape, including a first part 65 and a second part 66 integrally formed with the first part and transversely attached thereto. Each of the first and second parts 65, 66 of the outside corner portion 63 includes an outer edge portion 67, 68, respectively, for overlapping placement against selected surfaces of the perpendicular wall panel sections 12, 13.

The outside corner flashing unit 62 also includes a pair of spaced apart stop plates 70, 72 integrally attached to the first and second parts 65, 66, respectively, of the outside corner portion 63. As seen in FIG. 5, the stop plates 70, 72 are perpendicular to one another, and contact the ends of the panel sections 12, 13 in the completed installation. Each of the stop plates 70, 72 has an inwardly extending flange 71, 73 integrally formed therewith, as shown.

The outside corner flashing unit 62 further includes a bridge plate 74 integrally formed with, and interconnecting the stop plates 70, 72. The bridge plate is disposed substantially at a 45 degree angle with respect to the stop plates 70, 72, as shown.

The outside corner flashing unit still further includes two substantially parallel spaced apart webs 76, 78 integrally attached to and extending between the bridge plate 74 and the flanges 71, 73 at the inner ends of the stop plates.

The bridge plate 74 and the webs 76, 78 define an open channel 75 therebetween, adapted to slidably receive a threaded nut 41 therein. The flanges 71, 73 extend toward one another, from the inner ends of the stop plates 70, 72, to cover part of the open channel 75.

Inside Corner Flashing Unit

The inside corner flashing unit 64 is provided for placement opposing the outside corner flashing unit 60, and for clamping edge portions of the adjacent wall corner panel sections 12, 13 therebetween.

The inside corner flashing unit 64 includes a center plate 80, having a plurality of openings 81 formed therethrough, and two spaced apart side members 82, 84 integrally attached to and extending away from the center plate 80.

Each of the side members 82, 84 has a respective side wall portion 83, 85 and flange 86, 88 extending substantially transversely from the side wall portion. The flanges 86, 88 of the inside corner flashing unit 64 are substantially perpendicular to one another, and are provided for overlapping placement against selected surfaces of the adjacent corner wall panel sections 12, 13.

Using the Corner Flashing Units

It will be seen from a review of FIGS. 4 and 5 that when joining adjacent corner wall panel sections 12, 13 together using the inside and outside corner flashing units 62, 64 hereof, the outside corner flashing unit 62 is placed between and touching the panel ends with the stop members 70, 72 touching end portions of the panel sections, and with the flanges 67, 68 overlapping the outside end surfaces of the panels. Then, a suitable number of UNISTRUT® nuts 41 are placed sideways inside of the channel 75, and the nuts are then rotated 90 degrees so that they fit behind the opposed flanges 71, 73 of the stop members 70, 72.

Then, the inside linear flashing unit 24 is slid into the corner recess defined between the panel sections 12, 13 with the flanges 86, 88 partially covering side edge portions of the panels. A screw, bolt or other threaded fastener 111 is then inserted through each opening 81 in the inside corner flashing unit, and is threadably installed in the nut 41. The fastener 111 is then tightened to draw the inside and outside flashing units 62, 64 toward one another, and to clamp the ends of the wall panels 12, 13 therebetween, thereby connecting them.

The Window Frame Interface Member

Figure 6:
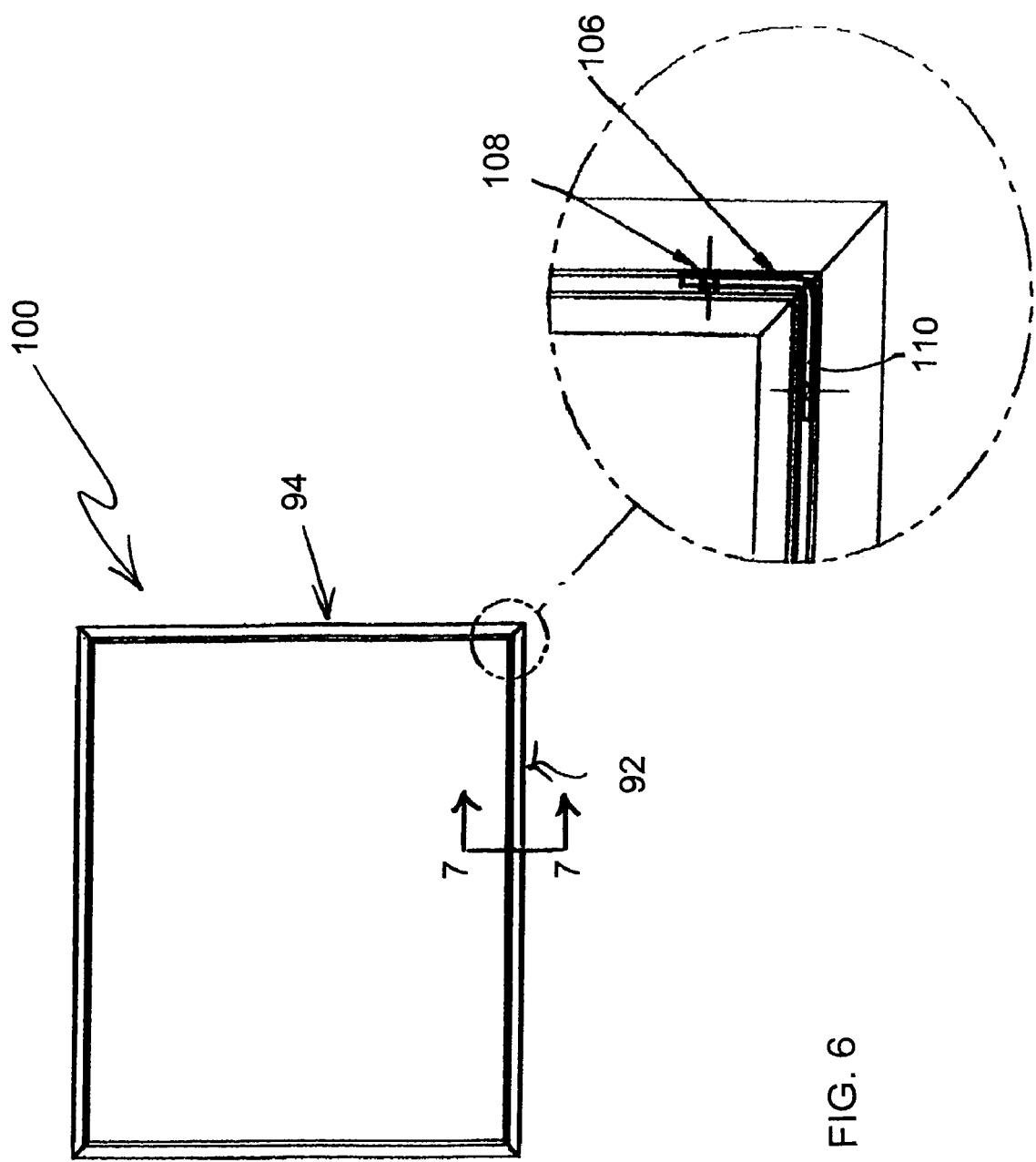
FIG. 6 is a front plan view of a window frame assembly according to the present invention, with an expanded cross-sectional detail view of a corner portion thereof shown in an insert.
Figure 7:
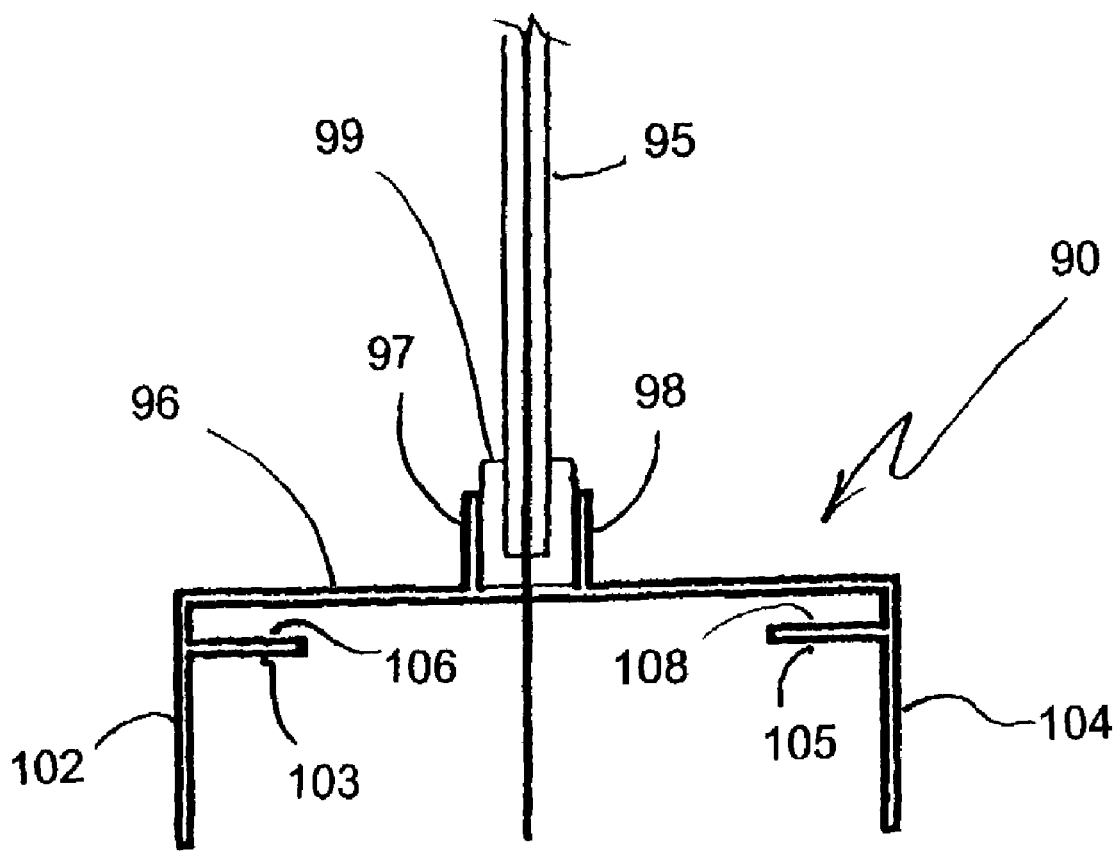
FIG. 7 is a cross-sectional view of the frame assembly of FIG. 6, taken along the line 7—7 in FIG. 6.
Figure 8:
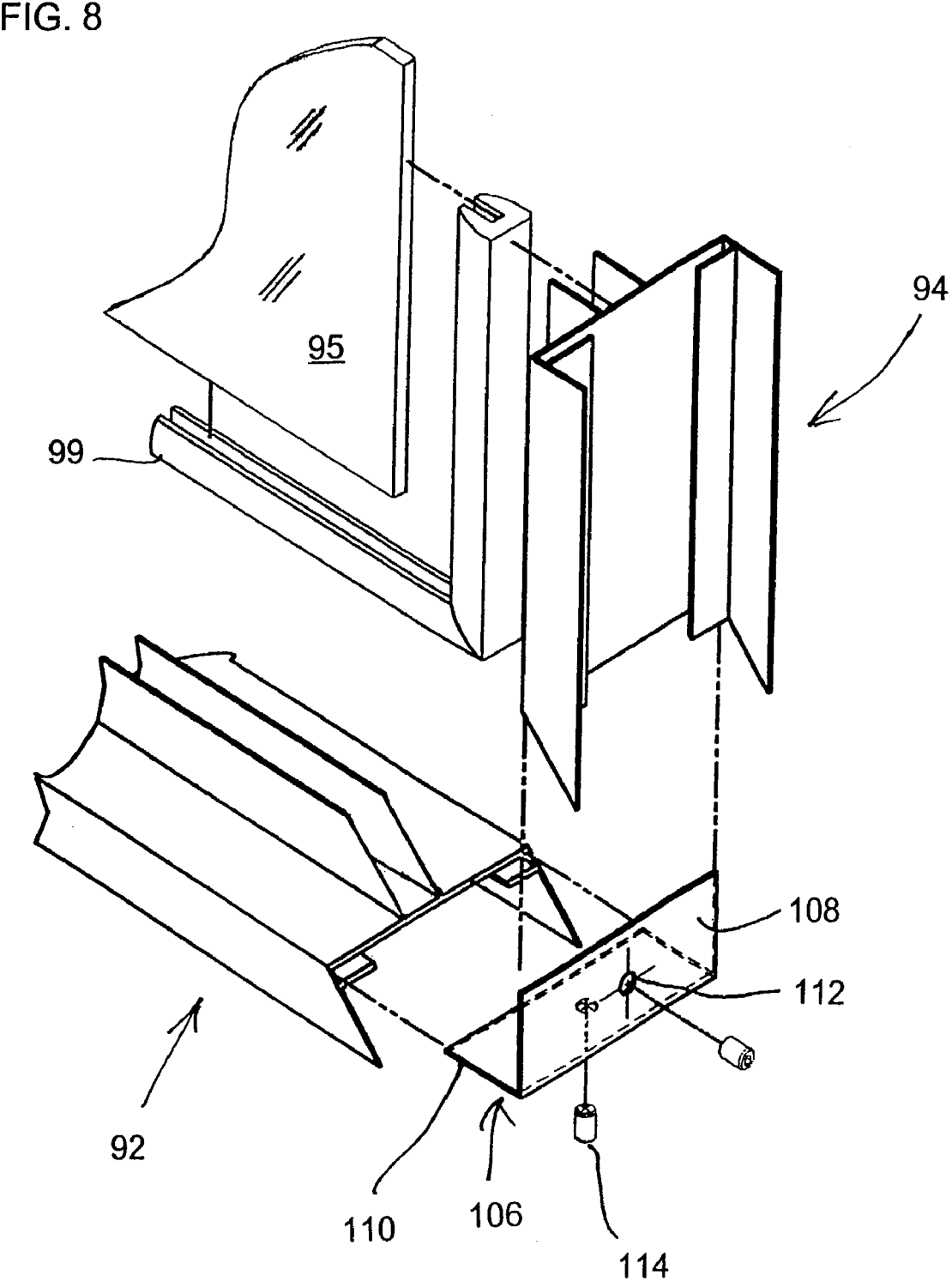
FIG. 8 is an exploded perspective view, partially cut away, of the frame assembly of FIG. 6, also showing part of a windowpane.

Referring now to FIGS. 6–8, it will be seen that the present invention also encompasses an elongated window frame interface member 90 for forming into a plurality of window frame segments, such as those shown at 92, 94 in FIG. 8. The window frame segments thus formed are intended for placement surrounding a relatively thin windowpane 95 or other thin panel, in a window opening formed in a relatively thick wall panel section 12.

A window frame interface member 90, according to the present invention, includes a generally flattened elongated sill bridge section 96, and two spaced apart pane supports 97, 98 attached to the sill bridge section 96 and extending substantially transversely therefrom. The pane supports 97, 98 are substantially parallel to one another, and are spaced inwardly from the outer side edges of the sill bridge section 96.

The window frame interface member 90 also includes two spaced apart parallel side braces 102, 104, attached to the outer side edges of the sill bridge section 96 and extending substantially transversely therefrom, in a direction substantially opposite the pane supports 97, 98.

Each of the side braces 102, 104 of the window frame interface member 90 has a respective truncated ledge 103, 105 extending inwardly thereon. The truncated ledges 103, 105 are substantially coplanar with one another, and they are substantially parallel to, and spaced apart from the sill bridge section 96. The truncated ledges 103, 105 cooperate with the sill bridge section 96 to define respective slots 106, 108 therebetween, at opposite sides of the sill bridge section. The slots 106, 108 are situated at a surface of the window frame interface member 90 opposite the pane supports 97, 98 and near the junctions of the sill bridge section 96 and the side braces 102, 104.

In use, the window frame interface member 90 is subdivided into frame segments 92, 94 by cutting therethrough at a 45 degree angle, so that each end of each section slopes outwardly as it moves from the pane supports 97, 98 into and through the side braces 102, 104. This results in the frame segments 92, 94 having a peripheral outline somewhat similar to the angled ends on sections of a wooden picture frame, as seen from a vantage point similar to that shown in FIG. 6. Four of these segments may then be joined together to surround a translucent glass or plastic windowpane 95, with a flexible rubber or elastomeric seal 99 therebetween.

At the junction of each abutting pair of frame segment ends, an L-bracket 106 is used to interconnect the segments together. The L-bracket 106 has two legs 108, 110. Each leg 108, 110 of the L-bracket has a threaded hole 112 formed therethrough to receive a threaded fastener, such as a bolt or alien screw 114. Each leg 108, 110 of the L-bracket 106 fits slidably into the slots 106, 108 defined between a pair of the truncated ledges 103, 105 and the sill bridge section 96 of a frame segment, as shown in FIG. 8. When the L-bracket 106 has been slidably installed in each of the slots of two abutting frame segments 92, 94, the frame segments are moved together until they are contacting one another, and then each of the fasteners 114 is tightened inwardly in the L-bracket until it contacts the sill bridge section. Further tightening of the fasteners 114 forces the L-bracket 106 into interfering contact with the truncated ledges 103, 105. This effectively locks the frame segments together. The completed window assembly 100 may be placed in between upper and lower panel sections.

Although the present invention has been described herein with respect to a limited number of presently preferred embodiments, the foregoing description is intended to be illustrative, and not restrictive. Those skilled in the art will realize that many modifications of the preferred embodiment could be made which would be operable. All such modifications, which are within the scope of the claims, are intended to be within the scope and spirit of the present invention.

The invention claimed is:

1. A kit of components for use in interconnecting adjacent wall panel sections, comprising:
   an elongated outside linear flashing unit and an elongated inside linear flashing unit for spaced-apart placement between two adjacent wall sections and for cooperating with selected fasteners to clamp end portions of said wall sections therebetween, said outside and inside linear flashing units having different shapes;
   said outside linear flashing unit comprising:
      a backing plate having a substantially planar midsection and opposed edge portions for overlapping placement against selected exterior wall surfaces of said adjacent wall panel sections, wherein said edge portions are integrally formed with and substantially coextensive with said midsection;
      two spaced apart side members integrally attached to and extending away from said backing plate, each of said side members comprising a first side wall portion and a flange extending substantially transversely from said side wall portion;

wherein said backing plate and said side members define an open channel therebetween adapted to slidably receive and retain a threaded nut therein, and wherein said flanges extend from said side wall portions toward one another to cover part of said open channel, said outside linear flashing unit configured for use with said side members thereof facing inwardly towards the inside linear flashing unit; and said inside linear flashing unit provided for placement opposing said outside linear flashing unit and for clamping said edge portions of said adjacent wall panel sections between said inside and outside linear flashing units, said inside linear flashing unit comprising:

a center plate having a plurality of openings formed therethrough;

two spaced apart side members integrally attached to and extending away from said center plate, each of said side members comprising a side wall portion and a flange extending substantially transversely from said side wall portion;

wherein said flanges of said inside linear flashing unit extend from said side wall portions away from one another in opposite directions, and are provided for overlapping placement against selected interior wall surfaces of said adjacent wall panel sections opposite the exterior wall surfaces overlapped by said edge portions of said backing plate, and wherein each of said spaced apart side members of said outside linear flashing unit includes a first side wall portion and a second side wall portion substantially parallel to the first side wall portion, said first side wall portions define said open channel with said backing plate, and said second side wall portions are adapted to engage with laterally inner wall surfaces of said adjacent wall panel sections.

2. The kit of claim 1, further comprising a plurality of nuts for placement in said open channel of said outside linear flashing unit, and a plurality of threaded fasteners for insertion through said openings in said center plate and for threaded engagement with said nuts.

3. The kit of claim 1, further comprising at least one windowpane interface member for placement as window frame segments surrounding a windowpane in a window opening formed in one of said wall panel sections.

4. The kit of claim 1, wherein said inside linear flashing includes a portion which is substantially U-shaped in cross section.

5. The kit of claim 1, wherein said openings in said center plate of said inside linear flashing unit are elongate and spaced from each other in a longitudinal direction of said center plate.

6. A kit of components for use in interconnecting adjacent wall panel sections, said kit comprising:

an elongated outside linear flashing unit and an elongated inside linear flashing unit for spaced-apart placement between two adjacent wall sections and for cooperating with selected fasteners to clamp end portions of said wall sections therebetween, said outside and inside linear flashing units having different shapes;

said outside linear flashing unit comprising:

a backing plate having a substantially planar midsection and opposed edge portions for overlapping placement against selected exterior wall surfaces of said adjacent wall panel sections, wherein said edge portions are integrally formed with and substantially coextensive with said midsection;

two spaced apart side members integrally attached to and extending away from said backing plate, each of said side members comprising a first side wall portion and a flange extending substantially transversely from said side wall portion;

wherein said backing plate and said side members define an open channel therebetween adapted to slidably receive and retain a treaded nut therein, and wherein said flanges extend from said side wall portions toward one another to cover part of said open channel, said outside linear flashing unit configured for use with said side members thereof facing inwardly towards the inside linear flashing units; and said inside linear flashing unit provided for placement opposing said outside linear flashing unit and for clamping said edge portions of said adjacent wall panel sections between said inside and outside linear flashing units, said inside linear flashing unit comprising:

a center plate having a plurality of openings formed therethrough;

two spaced apart side members integrally attached to and extending away from said center plate, each of said side members comprising a side wall portion and a flange extending substantially transversely from said side wall portion;

wherein said flanges of said inside linear flashing unit extend from said side wall portions away from one another in opposite directions, and are provided for overlapping placement against selected interior wall surfaces of said adjacent wall panel sections opposite the exterior wall surfaces overlapped by said edge portions of said backing plate, the further comprising a cap for covering placement between said side wall portions and over said center plate of said inside linear flashing unit.

7. A kit of components for use in interconnecting adjacent wall panel sections, comprising:

an elongated outside linear flashing unit and an elongated inside linear flashing unit for spaced-apart placement between two adjacent wall sections and for cooperating with selected fasteners to clamp end portions of said wall sections therebetween, said outside and inside linear flashing units having different shapes;

said outside linear flashing unit comprising:

a backing plate having opposed edge portions for overlapping placement against selected surfaces of said adjacent wall panel sections;

two spaced apart side members integrally attached to and extending away from said backing plate, each of said side members comprising a first side wall portion, a second side wall portion spaced away from the first side wall portion and provided for abutting placement against one of said end portions of said wall sections, and a flange interconnecting said first and second side wall portions and extending substantially transversely from said first side wall portion;

wherein said backing plate and said side members define an open channel therebetween adapted to slidably receive a threaded nut therein, and wherein said flanges extend from said side wall portions toward one another to cover part of said open channel, said outside linear flashing unit configured for use with said side members thereof facing inwardly towards the inside linear flashing unit; and said inside linear flashing unit provided for placement opposing said outside linear flashing unit and for clamping edge portions of said adjacent wall panel sections between said inside and outside linear flashing units, said inside linear flashing unit comprising:

a center plate having a plurality of openings formed therethrough;

two spaced apart side members integrally attached to and extending away from said center plate, each of said side members comprising a side wall portion and a flange extending substantially transversely from said side wall portion;

wherein said flanges of said inside linear flashing unit extend from said side wall portions away from one another in opposite directions, and wherein said flanges of said inside linear flashing unit are provided for overlapping placement against selected surfaces of said adjacent wall panel sections.

8. The kit of claim 7, further comprising a cap for covering placement between said side wall portions and over said center plate of said inside linear flashing unit.

9. The kit of claim 7, further comprising a plurality of nuts for placement in said open channel of said outside linear flashing unit, and a plurality of threaded fasteners for insertion through said openings in said center plate and for threaded engagement with said nuts.

10. The kit of claim 7, wherein each nut comprises a main body log having a threaded opening therein and a spring connected to one side of the main body; and when the nut is disposed in the open channel of said outside linear flashing unit, outer edges of the main body engage the flanges of said outside linear flashing unit, and the spring engages the backing plate of said outside linear flashing unit, such that the nut is normally maintained in place within the channel by the force of the spring.

11. The kit of claim 7, further comprising at least one windowpane interface member for placement as window frame segments surrounding a windowpane in a window opening formed in one of said wall panel sections.

* * * * *